(12) United States Patent
Nakamatsu (10) Patent No.: US 10,365,410 B2
(45) Date of Patent: Jul. 30, 2019

(54) OPTICAL ELEMENT AND DISPLAY DEVICE (71) Applicant: Sharp Kabushiki Kaisha, Sakai, Osaka (JP)

(72) Inventor: Kenichiro Nakamatsu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/125,282

(22) PCT Filed: Aug. 21, 2014

(86) PCT No.: PCT/JP2014/071824
§ 371 (c)(1),
(2) Date: Sep. 12, 2016

(87) PCT Pub. No.: WO2015/136734
PCT Pub. Date: Sep. 17, 2015

(65) Prior Publication Data
US 2017/0082782 A1 Mar. 23, 2017

(30) Foreign Application Priority Data

Mar. 14, 2014 (JP) ................. 2014-052042

(51) Int. Cl.
G02B 1/118 (2015.01)
G02B 1/18 (2015.01)
(Continued)

(52) U.S. Cl.
CPC ................ *G02B 1/118* (2013.01); *G02B 1/14* (2015.01); *G02B 1/18* (2015.01); *G02B 27/0006* (2013.01)

(58) Field of Classification Search
CPC . G02B 1/118; G02B 1/18; G02B 1/10; G02B 1/105; G02B 1/111;
(Continued)

(56) References Cited

U.S. PATENT DOCUMENTS 6,649,266 B1 * 11/2003 Gross ........................ B05D 1/40
427/256
2010/0284087 A1 11/2010 Yamada et al.
(Continued)

FOREIGN PATENT DOCUMENTS

JP H10-005685 A 1/1998
JP 2001-233956 A 8/2001
(Continued)

OTHER PUBLICATIONS

International Search Report PCT/ISA/210 for International Application No. PCT/JP2014/071824 dated Sep. 16, 2014.

*Primary Examiner* — Marin Pichler
(74) *Attorney, Agent, or Firm* — Harness, Dickey & Pierce, P.L.C.

(57) ABSTRACT

A optical element prevents a contaminant component adhering to the edge thereof from spreading through the capillary action and thus from forming a stain. A display device includes the element. An optical element includes a front surface provided with projected portions at a pitch equal to or shorter than the wavelength of visible light, the front surface having a contact angle with water of 100° or greater at least at an edge and preferably having a contact angle with hexadecane of 20° to 100° at least at an edge. A display device includes such an optical element.

5 Claims, 6 Drawing Sheets (51) Int. Cl.
*G02B 1/14* (2015.01)
*G02B 27/00* (2006.01)

(58) Field of Classification Search
CPC ....... B29D 11/00317–00355; H01L 31/02168;
H01L 31/0284; B05D 5/06; B05D 5/061;
B05D 5/083
USPC .......... 359/601, 605, 606; 427/162; 252/582
See application file for complete search history.

(56) References Cited

U.S. PATENT DOCUMENTS

| | | |
|---|---|---|
| 2010/0291317 A1 | 11/2010 | Imaoku et al. |
| 2011/0002041 A1 | 1/2011 | Tazawa |
| 2011/0176216 A1* | 7/2011 | Kawauchi ........ B29D 11/00903 359/614 |
| 2012/0189828 A1* | 7/2012 | Inomata ................ G02B 1/105 428/206 |
| 2013/0016430 A1* | 1/2013 | Ogawa ................... G02B 1/105 359/614 |
| 2014/0098422 A1 | 4/2014 | Fukuda et al. |

FOREIGN PATENT DOCUMENTS

| | | |
|---|---|---|
| JP | 2007/004201 A | 1/2007 |
| JP | 2008/051847 A | 3/2008 |
| JP | 2008-276059 A | 11/2008 |
| JP | 2011/028229 A | 2/2011 |
| JP | 2012/014084 A | 1/2012 |
| JP | 2012-152446 A | 8/2012 |
| WO | WO-2009/110139 A1 | 9/2009 |
| WO | WO-2009/118943 A1 | 10/2009 |
| WO | WO-2012/133946 A1 | 10/2012 |

* cited by examiner

OPTICAL ELEMENT AND DISPLAY DEVICE

TECHNICAL FIELD

The present invention relates to optical elements and display devices. More specifically, the present invention relates to an optical element provided on the front surface with projected portions having a size equal to or smaller than the wavelength of visible light, and thus achieving a low reflectance; and a display device including the element.

BACKGROUND ART

Known optical elements are films on which a "moth-eye structure", a kind of nanometer-sized projection and recess structure (nanostructure), is formed (e.g. Patent Literatures 1 to 5). The moth-eye structure may be one including many nanometer-sized cone-shaped projections on the front surface of a base material, for example. Such a moth-eye structure has a continuously changing refractive index from the air layer to the base material to cause the front surface of the base material to be non-optical for incident light, significantly reducing the reflected light.

CITATION LIST

Patent Literature

Patent Literature 1: JP 2007-4201 A
Patent Literature 2: JP 2008-51847 A
Patent Literature 3: WO 2009/110139 A
Patent Literature 4: JP 2011-28229 A
Patent Literature 5: WO 2012/133946 A

SUMMARY OF INVENTION

Technical Problem

Conventional films with a nanostructure on the front surface, however, have been found to be problematic in handleability. That is, in studies aiming at practical use of a film having a nanostructure on the front surface, the inventor of the present invention has found that a stain often spreads from the edge of a film toward the inner side. As a result of investigating the cause thereof, the inventor has found that contaminants can adhere to a side surface because the nanostructure on the side surface of the film is exposed while the front surface of the film is usually covered with a protective film for purposes such as retention of optical properties. The inventor has then found that even when a small amount of contaminants adheres only to the side surface, a fine structure such as a nanostructure causes the capillary action through which components in the contaminants penetrate the side surface of the film to spread toward the inside of the film, thereby forming a large stain. The inventor has also found that the substances responsible for such a stain include sebum and ultraviolet-curable resins (in particular, plasticizers of specific kinds contained in resins) for panel attachment.

The above stains peculiar to a nanostructure have special properties that are different from typical stains as described below and that have not been recognized before. That is, the verification studies show that when a film having a nanostructure on which the stains are generated is left to stand after the protective film is peeled off to expose the front surface of the film, the stains peculiar to a nanostructure disappear. For example, when a film including a large stain with a width of 8 mm and a penetration depth of 4 mm was left to stand at room temperature for 48 hours in a laboratory, the stain became fainter to be practically invisible to the naked eye. This is presumably because the nanostructured projections, continuously formed in the film, allow the stain components to spread between the nanostructured projections with time, so that the stain appears to have disappeared. The part where the stain was generated in the moth-eye structure, a kind of nanostructure, was observed with an electron microscope before and after standing at room temperature. Before standing, the height of the projections of the moth-eye structure was found to be small due to the stain components filling the gaps between the projections in the moth-eye structure. In contrast, after standing for 48 hours in a laboratory, the height and shape of the projections of the moth-eye structure were substantially the same as those in normal parts where no stain was generated. In this manner, in the parts where the stain disappeared in observation by the naked eye, the shape of the projections was comparable to that in the normal parts and defects in the moth-eye structure (e.g. breaking of projections, sticking between the projections) were not observed, meaning that the parts were found to be back to the normal state microscopically.

Furthermore, in order to determine the relation between the disappearance of a stain and optical properties, four samples in which a stain was generated were randomly selected, and the reflectance and chromaticity before and after the disappearance of the stain were measured. The measurement was performed by the following procedure.

(1) Four samples with tough greasy dirt were randomly picked up.
(2) A film only was peeled off from a liquid crystal display device, and attached to a black acrylic plate.
(3) The reflection spectra of a normal part: and a stain-generated part (stain-generated state) were measured with 5° specular reflection.
(4) After the samples were left to stand at room temperature for a certain period of time, the stain in each sample was confirmed by visual observation to have become fainter. Then, the reflection spectrum of the stain-generated part where the stain became fainter (stain-disappeared state) was measured with 5° specular reflection.

Figure 7:
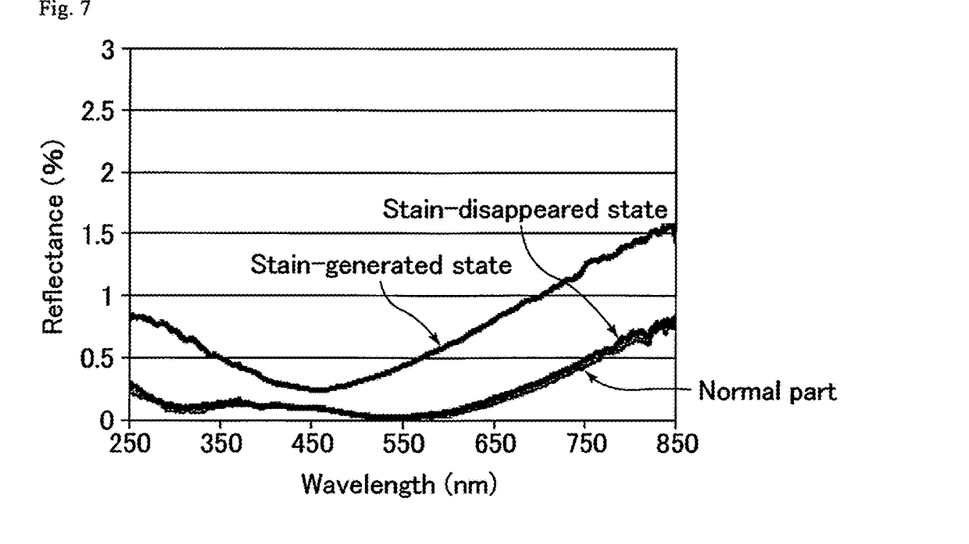
FIG. 7 is a graph showing the results of measuring a 5° specular reflection spectrum before and after disappearance of a stain in a first stain-generated part of the film having a conventional moth-eye structure.
Figure 8:
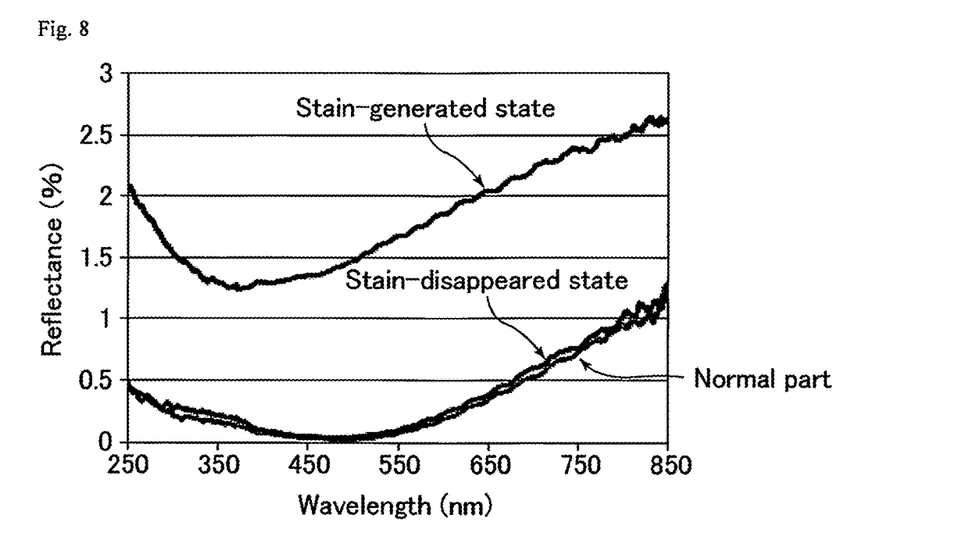
FIG. 8 is a graph showing the results of measuring 5° specular reflection spectrum before and after disappearance of a stain in a second stain-generated part of the film having a conventional moth-eye structure.
Figure 9:
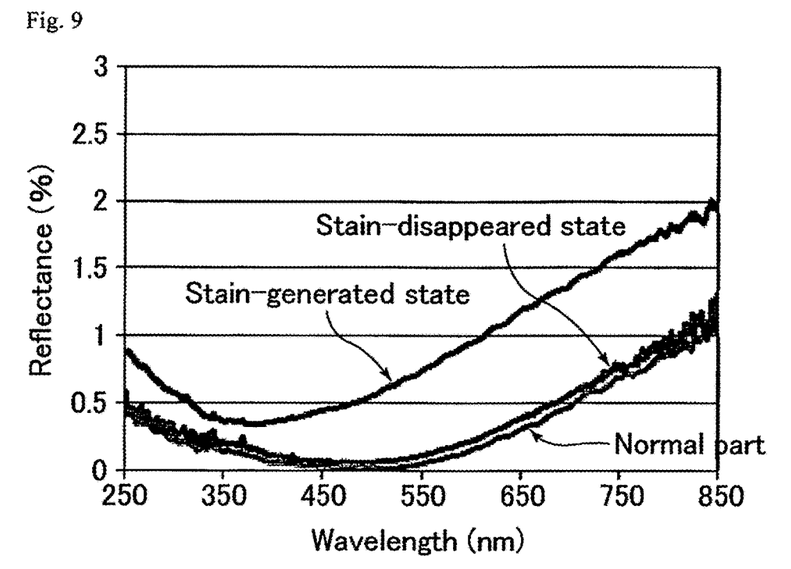
FIG. 9 is a graph showing the results of measuring a 5° specular reflection spectrum before and after disappearance of a stain in a third stain-generated part of the film having a conventional moth-eye structure.
Figure 10:
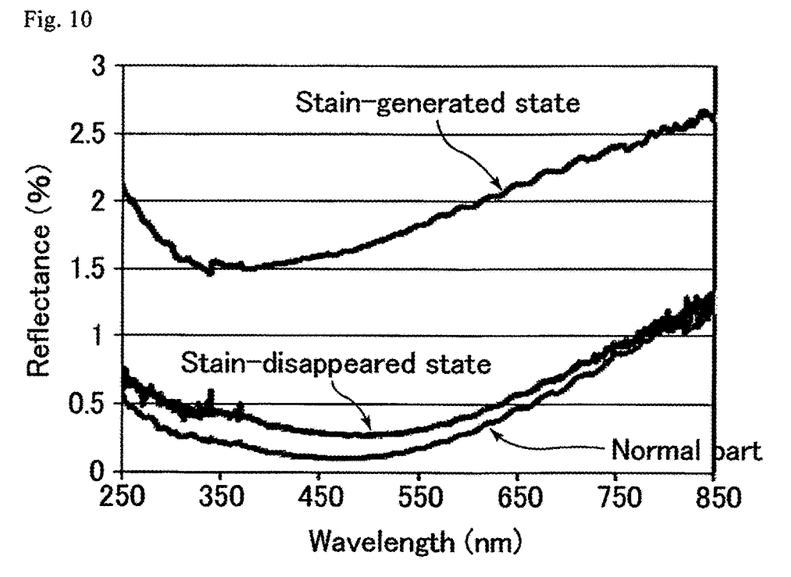
FIG. 10 is a graph showing the results of measuring a 5° specular reflection spectrum before and after disappearance of a stain in a fourth stain-generated part of the film having a conventional moth-eye structure.
Figure 11:
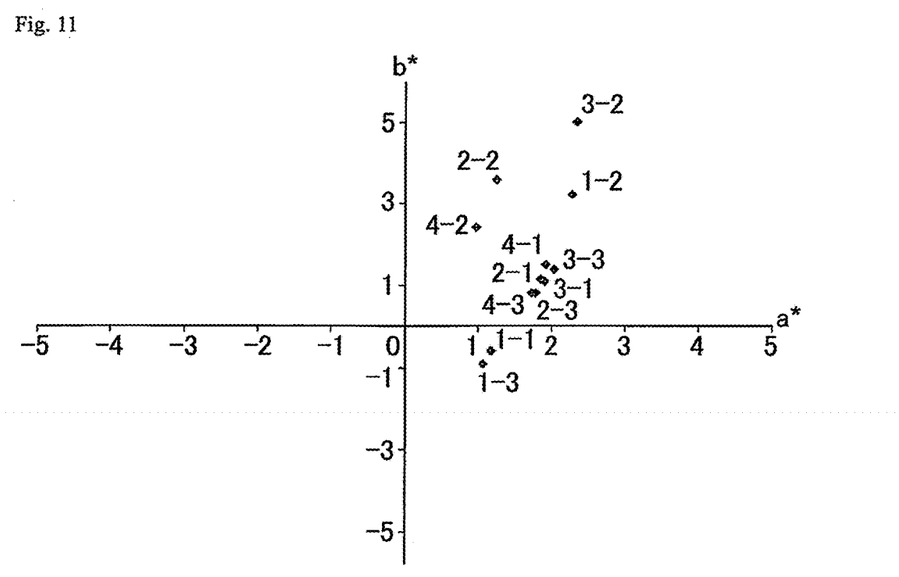
FIG. 11 is a graph showing the results of measuring chromaticity before and after disappearance of the stain in the first to fourth stain-generated parts of the film having a conventional moth-eye structure.

FIGS. 7 to 11 show the measurement results. FIG. 7 is a graph showing the results of measuring a 5° specular reflection spectrum before and after disappearance of a stain in a first stain-generated part of the film having a conventional moth-eye structure. FIG. 8 is a graph showing the results of measuring a 5° specular reflection spectrum before and after disappearance of a stain in a second stain-generated part of the film having a conventional moth-eye structure. FIG. 9 is a graph showing the results of measuring a 5° specular reflection spectrum before and after disappearance of a stain in a third stain-generated part of the film having a conventional moth-eye structure. FIG. 10 is a graph showing the results of measuring a 5° specular reflection spectrum before and after disappearance of a stain in a fourth stain-generated part of the film having a conventional moth-eye structure. FIG. 11 is a graph showing the results of measuring chromaticity before and after disappearance of the stain in the first to fourth stain-generated parts of the film having a conventional moth-eye structure. In the "X-Y" notation in FIG. 11, X represents one of the first to fourth stain-generated part numbers and Y is any one of 1 to 3, with 1 representing a normal part, 2 representing a stain-generated state, and 3 representing a stain-disappeared state. For example, "3-2" in FIG. 11 represents a measurement result of the third stain-generated part in the stain-generated state.

As is clear from the results shown in FIGS. 7 to 10, when the stains have become fainter and disappeared, the reflection spectrum is substantially the same as the spectrum of the normal part, which means that the reflectance has been sufficiently reduced. Also, as is clear from the results shown in FIG. 11, when the stains have become fainter and disappeared, the chromaticity (a*b*) has also been back to the value close to that in the normal part. Hence, the part with a stain having become fainter and disappeared shows a result comparable to the normal part, and thus does not affect the quality of the film.

As described above, the stains peculiar to a nanostructure have a tendency to disappear when the front surface of the film, is left to stand while being exposed to the air. This tendency has probably not been found before, and even if it has been found, the means to deal with the tendency has not been found. For example, Patent Literatures 1 to 3 do not include any statements focusing on the stains peculiar to a nanostructure, and did not solve the problem of stain generation at the edge of a film having a nanostructure on the front surface. Also, Patent Literatures 4 and 5 each disclose that a moth-eye structure allows contaminants such as fingerprints to penetrate the film through the capillary action. The inventions disclosed in Patent Literatures 4 and 5 each are designed to have hydrophilicity on the front surface thereof to allow easy wiping of contaminants, but are not to reduce generation of contamination itself or spread of the contaminants (capillary action between the projections in the moth-eye structure).

Meanwhile, in the actual manufacturing setting, even a stain that can be removed by peeling off the protective film is desired to be prevented. For example, in the case that the manufacturer (distributor) and the user (purchaser) of optical films are different, a product with a stain is regarded as a defective product.

The present invention was made in view of the above current state of the art, and aims to provide an optical element which prevents a contaminant component adhering to the edge thereof from spreading through the capillary action and thus from forming a stain; and a display device including the element.

Solution to Problem

The inventor of the present invention made various studies on methods for preventing a stain at the edge of a base material when projected portions are formed on the front surface of the base material at a pitch equal to or shorter than the wavelength of visible light. As a result, the inventor has focused on the structure in which the side surface of the optical element is exposed even when the front surface of the optical element is covered with a protective component (protective film), and a contaminant component adhering to the side surface spreads to form a stain. The inventor has found that, in order to prevent generation of a stain, it is important to produce a front surface to which contaminant, components hardly adhere and on which a stain hardly spreads, and that a water-repellent front surface having a contact angle with water of 100° or greater can prevent contaminant components adhering to the edge from spreading through the capillary action and thus from forming a stain. In this manner, the inventor has solved the above problem, thereby arriving at the present invention.

That is, one aspect of the present invention may be an optical element including a front surface provided with projected portions at a pitch equal to or shorter than the wavelength of visible light, the front surface having a contact angle with water of 100° or greater at least at an edge.

Another aspect of the present invention may be a display device including the above optical element.

Advantageous Effects of Invention

The optical element and display device of the present invention can prevent a contaminant component adhering to the edge of the optical element from spreading through the capillary action and thus from forming a stain.

DESCRIPTION OF EMBODIMENTS

Hereinafter, the embodiments and examples of the present invention are described with reference to the drawings. The present invention is not limited to the following embodiments and examples. Also, the configurations of the embodiments and examples may be appropriately combined or modified within the spirit of the present invention.

(1) Structure and Function of Optical Element

Figure 1:
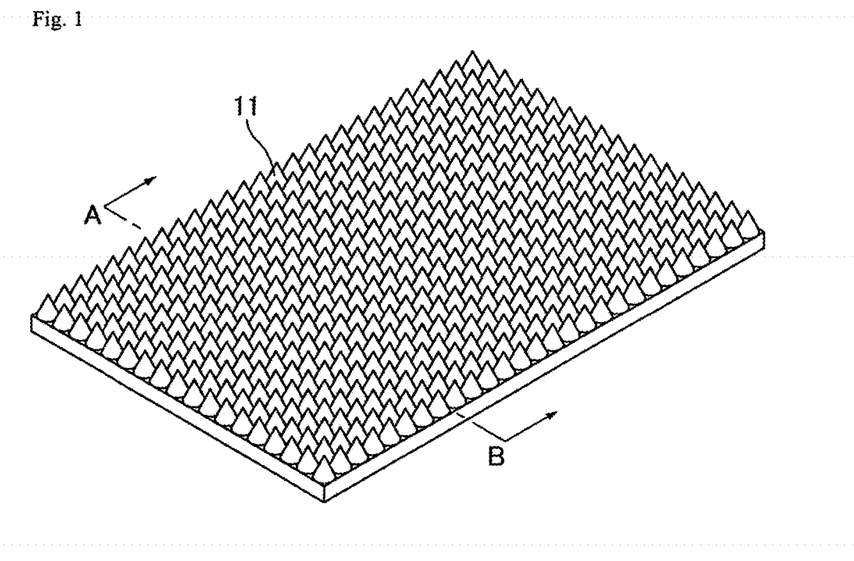
FIG. 1 is a perspective view schematically illustrating an optical element of an embodiment.
Figure 2:
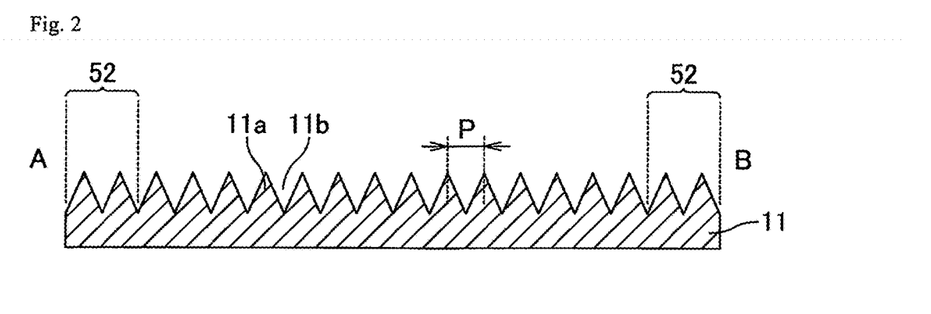
FIG. 2 is a schematic cross-sectional view illustrating an enlarged view of a cross section taken along the A-B line in FIG. 1.

The structure of the optical element of an embodiment is described with reference to FIG. 1 and FIG. 2. FIG. 1 is a perspective view schematically illustrating an optical element of an embodiment. FIG. 2 is a schematic cross-sectional view illustrating an enlarged view of a cross section taken along the A-B line in FIG. 1. As illustrated in FIG. 1 and FIG. 2, the optical element of the embodiment includes a film-like base material 11 provided on the front surface with projected portions (projections) 11a at a pitch (distance between the tops of the projected portions) P equal to or shorter than the wavelength of visible light. That is, the optical element of the embodiment corresponds to an antireflection film having a structure that resembles eyes of a moth (hereinafter, also referred to as a "moth-eye structure") on the front surface (hereinafter, such a film is also abbreviated as a "moth-eye structure"). FIG. 1 and FIG. 2 each illustrate the film enlarged in the cross-sectional direction so as to clearly show the moth-eye structure. In an actual film, the ratio of the height (lower than 1 μm) of the moth-eye structure to the area of the film is significantly low, and thus the moth-eye structure cannot actually be recognized as illustrated in FIG. 1 and FIG. 2 by the naked eye.

The height of the projected portions (projections) 11a constituting the moth-eye structure is not particularly limited. Still, the lower limit thereof is preferably 150 nm while the upper limit thereof is preferably 180 nm or lower. The pitch (distance between the tops of the projections) P may be any pitch equal to or shorter than the wavelength (780 nm) of visible light. The lower limit thereof is preferably 100 nm while the upper limit thereof is preferably 200 nm. The shape of the projected portions 11a may be any shape such as a substantially circular cone shape (cone-like shape). The projected portions 11a are preferably randomly disposed on the front surface of the base material. From the viewpoint of forming such projected portions 11a, the suitable material of the base material 11 is a resin.

Figure 3:
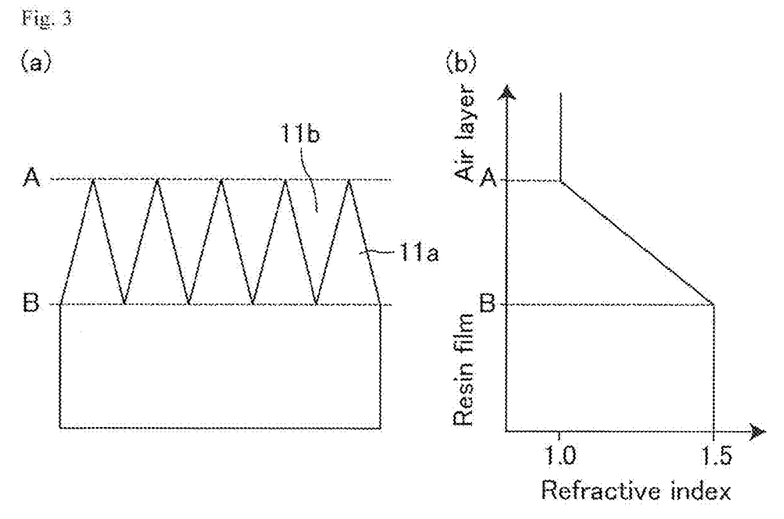
FIG. 3 includes views for describing the principle of how the optical element of the embodiment can reduce the reflectance, with the view (a) illustrating a cross section of a moth-eye structure and the view (b) schematically illustrating changes in refractive index in the cross section of the moth-eye structure.

The percentage (visible light reflectance) of reflection of incident visible light in the interface between the air layer and the resin film having not been subjected to an anti-reflection treatment is typically 4%. This visible light reflectance can be reduced to about 0.15% by disposing a moth-eye film on a resin film. The reason therefor is described with reference to FIG. 3. FIG. 3 includes views for describing the principle of how the optical element of the embodiment can reduce the reflectance, with the view (a) illustrating a cross section of a moth-eye structure and the view (b) schematically illustrating changes in refractive index in the cross section of the moth-eye structure. Since the projected portions 11a constituting the moth-eye structure are smaller than the wavelength (380 to 780 nm) of visible light, the visible light behaves differently at the time of passing through a moth-eye structure interface from the behavior at the time of passing through a typical flat interface. That is, when the refractive index in the moth-eye structure region is calculated based on the volume ratio of the projected portions 11a made of a resin with a refractive index of 1.5 to the recessed portions (gaps between the projected portions 11a) made of the air having a refractive index of 1.0, the refractive index in the moth-eye structure region continuously increases from 1.0 in the air layer to 1.5 in the resin film as illustrated in the view (b) of FIG. 3. This means that an interface with a discontinuously changing refractive index does not exist for visible light that passes through the air layer having a refractive index of 1.0 (the region above the dotted line A in the view (a) of FIG. 3), the region having a moth-eye structure (the region between the dotted line A and the dotted line B in the view (a) of FIG. 3), and the base material 11 consisting entirely of a resin film having a refractive index of 1.5 (the region below the dotted line B in the view (a) of FIG. 3). For this reason, the moth-eye structure significantly reduces interfacial reflection. Although the view (b) of FIG. 3 illustrates the case where the material constituting the base material 11 has a refractive index of 1.5, the moth-eye structure similarly eliminates an interface with a discontinuously changing refractive index even when the refractive index of the material is not 1.5.

The front surface of the base material 11 provided with the projected portions 11a in the optical element of the embodiment is designed to have a contact angle with water of 100° or greater at least at an edge 52. The studies made by the inventor show that in a conventional moth-eye film, the gaps between the projected portions of the moth-eye structure function as the capillaries, allowing contaminants adhering to the edge 52 of the film or the side surface of the base material 11 to spread within the film, deteriorating the reflectance-reducing effect of the moth-eye structure. In the present embodiment, the film is designed to have a contact angle with water of 100° or greater at the edge, so that sebum adhering to the edge 52 or the side surface of the base material 11 can be prevented from spreading on the base material 11. This design can provide improved handleability to the optical element and allows the optical element to function sufficiently. Also, the front surface provided with the projected portions 11a may have a contact angle with water of 100° or greater in its entire region. In a region in which the contact angle with water is 100° or greater, contaminant components can be removed easily and cleanly by wiping with an organic solvent such as isopropyl alcohol (IPA). Hence, with the front surface designed to have a contact angle with water of 100° or greater in its entire region, even contaminant components adhering to the base material 11 can be removed. From the viewpoint of improving the stain-prevention effect, the lower limit of the contact angle with water is preferably 105°, more preferably 110°. The upper limit of the contact angle with water is preferably 150° more preferably 140°.

The contact angle with water can be achieved by selecting a material having a contact angle within the above specific range as the material of the base material 11. For example, in the case of forming a moth-eye structure by transferring the surface shape of a mold onto a resin (also referred to as a transfer resin), a resin with hydrophobicity after being cured (hydrophobic resin) can be used as the transfer resin. While the conventional transfer resin has commonly been a hydrophilic resin such that adhering contaminants can be easily wiped off, the present embodiment has a feature in use of a hydrophobic resin. Also, the contact angle may be adjusted to the above specific range by surface treatment.

The front surface of the base material 11 provided with the projected portions 11a in the optical element of the embodiment preferably has a contact angle with hexadecane of 20° to 100° at least at the edge 52. For an ultraviolet-curable resin for panel attachment, a butadiene-based plasticizer can be used, and this butadiene-based plasticizer is the substance that spreads through the capillary action to form a stain in a conventional moth-eye film. Hence, the film is designed to have a contact angle with hexadecane of 20° to 100° at the edge thereof, so that the butadiene-based plasticizer, even when adhering to the edge 52 or the side surface of the base material 11, can be prevented from spreading on the base material 11. This design can provide improved handleability to the optical element and allows the optical element to function sufficiently. The film may have a contact angle with hexadecane of 20° to 100° in its entire region provided with the projected portions 11a. From the viewpoint of improving the stain-prevention effect, the lower limit of the contact angle with hexadecane is preferably 25°, more preferably 30°. The upper limit of the contact angle with hexadecane is preferably 90°, more preferably 40°.

The contact angle with hexadecane can be achieved by selecting a material having a contact angle in the above specific range as the material of the base material 11, or by adjusting the contact angle to the above specific range by surface treatment.

Figure 4:
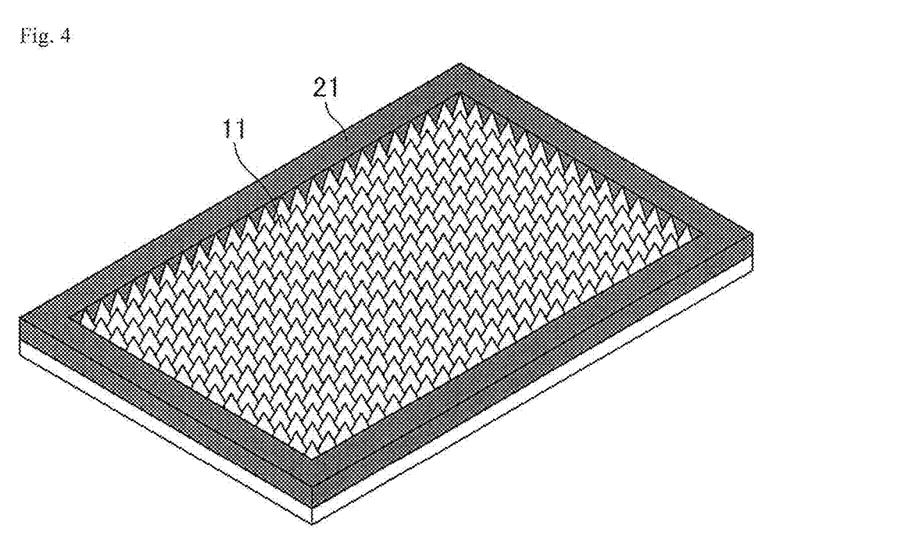
FIG. 4 is a perspective view schematically illustrating a state where ink is provided as a covering material at the edge of the optical element of the embodiment.

The optical element of the embodiment may include a covering material at the edge 52 of the front surface of the base material 11 provided with the projected portions 11a. FIG. 4 is a perspective view schematically illustrating a state where ink is provided as a covering material at the edge of the optical element of the embodiment. As illustrated in FIG. 4, the ink 21 is disposed on the base material 11 to fill recessed portions 11b. Although the ink 21 covers both the edge of the front surface of the base material 11 provided with the projected portions 11a and the side surface (upper half) of the base material 11 in FIG. 4, the ink 21 may cover only one of the edge and the side surface.

Examples of the ink 21 include ink containing at least one of a pigment and a dye. The ink 21 can be one for markers or one for industrial stamps. The markers may be washable markers or permanent markers. Examples of the markers include Shatihata stamp pad inks "SG-40" and "SG-240" and Shachihata stamp pad refill inks "SGN-40" and "SGN-240" from Shachihata Inc. (all of these containing carbon black); TAT indelible ink <all surfaces> black or red, namely "STG", "STG-1", and "STG-3", from Shachihata Inc. and black ink for Mckee Pro DX "YYS10-BK" from Zebra Co., Ltd. (all of these containing a pigment); Mckee series from Zebra Co., Ltd. (all of these containing a dye); and Sign Pens from Pentel Co., Ltd.

Since the reflectance-reducing effect of the moth-eye structure cannot be achieved at the edge 52 in which the ink 21 is disposed, the width of the edge 52 (distance from the side surface of the base material 11) is preferably narrow. The lower limit of the width of the edge 52 may be set to any value that allows practical prevention of contamination.

Figure 5:
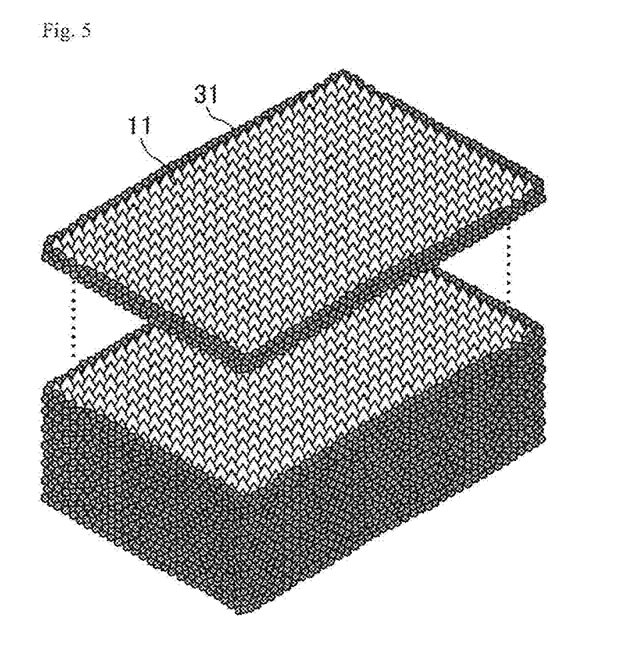
FIG. 5 is a perspective view schematically illustrating a state where fine powder is provided as a covering material at the edge of the optical element of the embodiment.

The covering material may be fine powder (fine particles). FIG. 5 is a perspective view schematically illustrating a state where fine powder is provided as a covering material at the edge of the optical element of the embodiment. Covering the side surface with fine powder 31 as illustrated in FIG. 5 prevents sebum or ultraviolet-curable resin from penetrating the film and thus from forming a stain.

The fine powder 31 may suitably be any powder with a small surface energy, such as a fluorine-based material. Any fine powder 31 with a small surface energy, even in a small, adhesion amount, repels sebum and other external substances that can adhere to the film, thereby providing a large effect of preventing substances such as contaminants from entering the moth-eye structure. Examples of the fluorine-based material include polytetrafluoroethylene (PTFE).

Examples of the method for covering with the fine powder 31 include spraying. In the case of spraying, an aerosol spray (fluorine-coating agent) containing fluorine-based fine particles is suitable, for example. The solvent of a fluorine-coating agent is an alcohol-containing volatile material which is relatively easily applied or disposed at the edge of a film. Specific examples of the fluorine-coating agent include "Sumilon Powder Spray" from Sumico Lubricant Co., Ltd. which is formed as a spray by processing PTFE powder with an extremely small amount of special oil. Also, a mixture of PTFE powder with an adhesive resin may be used. The adhesive resin can be, for example, ultraviolet-curable polydimethyl siloxane (silicone rubber).

The technique of covering the side surface with the fine powder 31 may be a method that causes the fine powder 31 to adhere only to the side surface, or may be, in the case that the front and back surfaces of the film each are covered with a protective film, a method that sprays powder to the entire film and removes the excess powder.

The covering process may be performed on each film, or may be performed on each unit of films (e.g. units of 100 films) as illustrated in FIG. 5 for easy mass processing. In the case of performing the process on each unit of films, the films having been subjected to the covering process may stick to each other, causing a problem in a subsequent process to be performed on each film. For example, a device configured to feed each film of a stack of 100 films may be used in the step of attaching a moth-eye film to a polarizing plate. At this time, if two or three moth-eye films sticking to each other are fed, the moth-eye films would be wasted. Such a feeding defect can be due to static electricity generated between films or due to sticking of films caused by an adhesive covering material bonded in the covering process. In contrast, in the method that causes the fine powder 31 (fluorine-based material) to adhere to the side surface of the film, the fine powder 31 itself is not sticky, and is therefore suitable for avoiding the feeding defect.

Ink and fine powder (fine particles) were described as examples of the covering material. The covering material may be any material that does not spread by penetrating the gaps between projected portions (nanostructured projections) provided at a pitch equal to or shorter than the wavelength of visible light. A quick-drying material is suitable. For example, "TUFFY" series which are moisture-proof insulating materials (ultraviolet-curable resins), namely "TF-4200EB-452" and "TF-3348-100B", from Hitachi Chemical Co., Ltd. can be used. The resin used as the covering material is preferably substantially free from non-reactive additives. The "non-reactive additives" refer to additives which are not taken into the polymer backbone in the curing reaction of the resin constituting the covering layer. A non-reactive additive, being not bonded to or hardly bonded to the polymer backbone, can form a stain. The expression "substantially free from" means that the amount of the additive(s) does not lead to formation of a stain. Examples of the non-reactive additives include specific kinds of plasticizer such as a butadiene-based plasticizer. Accordingly, examples of the resin substantially free from non-reactive additives include resins free from a plasticizer.

(2) Process for Manufacturing Optical Element

Figure 6:
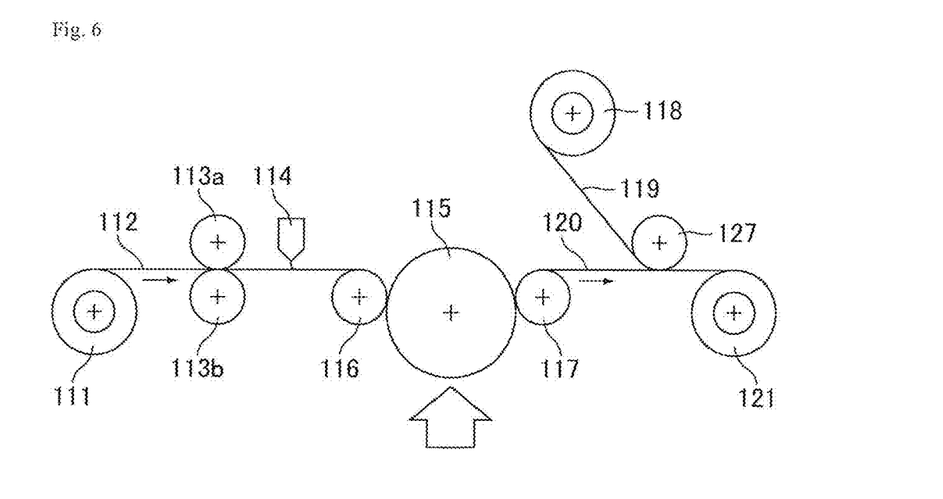
FIG. 6 is a cross-sectional view illustrating the overall configuration of a roller nanoimprinter used to produce the optical element of the embodiment.

A method utilizing nanoimprinting is described as an example of the method for manufacturing the optical element of the embodiment with reference to FIG. 6. FIG. 6 is a cross-sectional view illustrating the overall configuration of a roller nanoimprinter used to produce the optical element of an embodiment.

In the first stage, a moth-eye film is produced. The suitable method for producing a moth-eye film is a method including, as illustrated in FIG. 6, applying a transfer resin to provide a moth-eye structure to a base material film 112 using an application instrument such as a die coater or a slit coater; bringing the transfer resin into contact with a mold roll 115; and irradiating the transfer resin with energy rays such as ultraviolet rays to cure the resin. Rotating the mold roll 115 about a cylindrical or pillar axis enables continuous processing of pressing the mold onto the transfer target and releasing the mold from the transfer target. As a result, the method enables mass manufacture of a moth-eye film 120 having a moth-eye structure on the front surface at a high speed.

The roller nanoimprinter is described in more detail. A base material film roll 111 which is a roll of the base material film 112 is rotated first, so that the base material film 112, which has a belt-like shape, is transported from the base material film roll 111 in the direction indicated by the arrows in FIG. 6. The material of the base material film 112 is, for example, triacetyl cellulose (TAC) or polyethylene terephthalate (PET).

Next, the base material film 112 is passed between pinch rolls (retention rolls) 113a and 113b in pairs designed to control the tension, and is subjected to application of an uncured transfer resin by a die coater 114. Examples of the transfer resin include hydrophobic resin curable by energy rays such as ultraviolet rays. Then, the base material film 112 is moved by half a cycle along the outer periphery of the pillar-shaped mold roll 115. Here, the transfer resin applied to the base material film 112 is in contact with the outer periphery of the mold roll 115.

At the position where the base material film 112 first comes into contact with the outer periphery of the mold roll 115, a pillar-shaped pinch roll 116 made of rubber is disposed to face the outer periphery of the mold roll 115. At this position, the mold roll 115 and the pinch roll 116 hold the base material film 112 between them so that the mold roll 115 and the transfer resin are pressurized and brought into close contact with each other. Thereby, the projection and recess pattern formed on the outer periphery of the mold roll 115 is transferred to the transfer resin.

The base material film 112, while being moved along the outer periphery of the mold roll 115, is irradiated with energy rays such as ultraviolet rays from the side under the mold roll 115. As a result, the transfer resin is cured in the state of having the inverted pattern of the projection and recess pattern formed on the outer periphery of the mold roll 115. The white arrow in FIG. 6 indicates the radiation direction of the energy rays.

After being moved by half a cycle along the outer periphery of the mold roll 115, the base material film 112 is moved along a pinch roll 117 disposed to face the outer periphery of the mold roll 115 so as to be removed from the mold roll 115, together with a film of the cured transfer resin. In this manner, the moth-eye film 120 including the cured transfer resin with a continuous moth-eye structure is produced on the base material film 112.

Subsequently, a lamination film (protective component) 119, supplied by a lamination film roll 118 which is a roll of the lamination film 119, is attached by a pinch roll 127 to the transfer resin side of the moth-eye film 120. Thereby, the moth-eye film 120 and the lamination film 119 are brought into sufficiently close contact with each other. The lamination film 119 is a protective film temporarily attached to prevent contaminants from adhering to the front surface of the moth-eye film 120 or from scratching the front surface. Covering the front surface of the moth-eye film 120 with the lamination film 119 shields the front surface of the moth-eye film 120 from the external substances. Lastly, a laminated film of the moth-eye film 120 and the lamination film 119 which are in close contact with each other is rolled into a laminated film roll 121.

In the case of forming the ink 21 as the covering material, for example, the ink 21 is applied to the moth-eye film 120 produced by cutting the laminated film roll 121 into a predetermined size. The method for applying the ink 21 may be any method such as direct application to the side surface of the moth-eye film 120 using an application instrument such as a marker or brush, or application by spraying. Also, the ink 21 may be applied after the formation of the moth-eye structure and before attachment of the lamination film 119. The ink 21 can be applied with good workability when it is applied to the side surface of a roll of the moth-eye film 120. The application of the ink 21 may be performed on each film, or may be performed on each unit of films (e.g. units of 100 films) for easy mass processing.

(3) Use of Optical Element

The use of the optical element of the embodiment may be any use such as display device use. The display device may be any display device such as a liquid crystal display device. In the case that a conventional optical element is applied to a liquid crystal display device, a stain (reflection unevenness) may be generated when an ultraviolet-curable resin (sealing material) for liquid crystal panel attachment adheres to the edge of the optical element. In contrast, in the case that the optical element of the present embodiment is applied to a liquid crystal display device, the element can prevent generation of a stain even when the sealing material adheres to the edge of the element.

(4) Modified Example of Optical Element

Although a moth-eye film is used as the optical element in the above embodiment, the optical element may be any element provided on the front surface with projected portions at a pitch equal to or shorter than the wavelength of visible light. That is, the surface structure of the optical element may be a nanostructure other than the moth-eye structure, such as a wire-grid structure. Also, the optical element may have any thickness, and thus may be a film, a sheet, or a structure other than these.

EXAMPLES

The moth-eye films described in the embodiment can be attached to the display surface of the liquid crystal display device for prevention of glare of external light. In such a use, the ultraviolet-curable resin (sealing material) for liquid crystal panel attachment may adhere to the edge of the optical element to form a stain (reflection unevenness) on the optical element. Also, when the user of the liquid crystal display device touches the device, sebum may adhere to the edge of the optical element to form a stain (reflection unevenness) on the optical element.

In consideration of such stains, spread of a stain was observed in the following examples and comparative examples by producing moth-eye films from materials having different contact angles with water and with hexadecane, causing (1) sebum and (2) an ultraviolet-curable resin containing a butadiene-based plasticizer (Kyoritsu Chemical & Co., Ltd., trade name: "HRJ") to adhere to the front surface of each moth-eye film, and leaving the film to stand at room temperature for 24 hours.

The contact angle was measured by dropping a droplet (1 µl) on the measurement target front surface and measuring the contact angle by the θ/2 method (half-angle method). The measurement device can be, for example, a portable contact angle meter (trade name: PCA-1) from Kyowa Interface Science Co., Ltd.

Example 1

The material of the moth-eye film was a hydrophobic resin "NIF-A-1" (hereinafter, also referred to as a transfer resin A) from Asahi Glass Co., Ltd. The following are contact angles of the moth-eye film formed using the transfer resin A.

Contact angle with water: 111.3°
Contact angle with hexadecane: 38.5°

For reference, the following are the contact angles of a flat film formed using the transfer resin A.

Contact angle with water: 58.6°
Contact angle with hexadecane: 34.2°

As described above, even when the same material was used, the front surface of the moth-eye film and the front surface of the flat film had different contact angles.

Example 2

The material of the moth-eye film was a hydrophobic resin. "TPIR-219" (hereinafter, also referred to as a transfer resin B) from Tokyo Ohka Kogyo Co., Ltd. The following are contact angles of the moth-eye film formed using the transfer resin B.

Contact angle with water: 104.1°
Contact angle with hexadecane: smaller than 5°

Comparative Example 1

The material of the moth-eye film was a hydrophilic resin "AR206" (hereinafter, also referred to as a transfer resin C) from DNP Fine Chemicals Co., Ltd. The following are contact angles of the moth-eye film formed using the transfer resin C.

Contact angle with water: 46.8°
Contact angle with hexadecane: 8.5°

For reference, the following are the contact angles of a flat film formed using the transfer resin C.

Contact angle with water: 59.3°
Contact angle with hexadecane: 5.8°

Comparative Example 2

The material of the moth-eye film was a hydrophobic resin "MHC-100" (hereinafter, also referred to as a transfer resin D) from DNP Fine Chemicals Co., Ltd. The following are contact angles of the moth-eye film formed using the transfer resin D.

Contact angle with water: 11.8°
Contact angle with hexadecane: 34.4°

For reference, the following are the contact angles of a flat film formed using the transfer resin D.

Contact angle with water: 13.9°
Contact angle with hexadecane: 56.7°

(Experimental Results)

In Example 1, (1) the sebum remained in the adhering state and spread of a stain was not observed. The sebum could be easily wiped off with IPA to the level practically visually unrecognizable. The same results as the case of the sebum were obtained in the case of (2) the ultraviolet-curable resin.

In Example 2, (1) the sebum seemed to bleed when it first adhered to the film to cause the fingerprint to become less visible, but spread of a stain was not observed. The sebum could be easily wiped off with IPA to the level practically visually unrecognizable. As to (2) the ultraviolet-curable resin, spread of a stain, though it was small, was observed. The part of the ultraviolet-curable resin adhered to the film could be wiped off with IPA, but the part of the ultraviolet-curable resin spread as a stain could not be wiped off with IPA.

In Comparative Examples 1 and 2, each of (1) the sebum and (2) the ultraviolet-curable resin spread from the adhesion part to form a stain. The stain became larger with time.

These results show that a front surface having a moth-eye structure can prevent sebum from spreading and thus from forming a stain when the front surface has water-repellency and a contact angle with water of 100° or greater. In addition, when the front surface has oil-repellency and a contact angle with hexadecane of about 30° to 40°, the front surface prevents an ultraviolet-curable resin containing a butadiene-based plasticizer from spreading and thus from forming a stain.

[Additional Remarks]

Hereinafter, preferred modes of the optical element of the present invention are described. The modes may be appropriately combined within the spirit of the present invention.

The front surface preferably has a contact angle with hexadecane of 20° to 100° at least at an edge. Such a front surface can prevent generation of a stain even when a butadiene-based plasticizer, possibly contained in ultraviolet-curable resins for panel attachment, adheres to the front surface. The front surface may have a contact angle with hexadecane of 20° to 100° in its entire region.

Preferably, the optical element further includes a protective component that covers the front surface, and the protective component shields the front surface from external substances. The front surface in the optical element on which a nanostructure is formed is preferably covered with a protective component to prevent damages or contamination. However, in the case of conventional optical elements, a stain generated by a nanostructure is inhibited by a protective component from disappearing. In the optical element of the present invention, a stain generated by a nanostructure can be sufficiently prevented even when a protective component is used.

In the optical element, at least one of the edge of the front surface and the side surface surrounding the front surface may be covered with a covering material that fills the gaps between the projected portions. In this mode, stains caused by a nanostructure can be sufficiently prevented.

The covering material may be ink. Examples of the ink include an ink containing a dye and an ink containing a pigment.

The covering material may contain fluorine-based fine particles, and the fluorine-based fine particles may cover the side surface of the base material. In this mode, since the fine particles themselves are not adhesive, even when the covering process is performed on each unit of multiple films, a feeding defect in a subsequent process can be prevented.

The covering material may be a resin free from a plasticizer. Specific kinds of plasticizer such as a butadiene-based plasticizer are not bonded to or hardly bonded to the polymer backbone, and thus can form a stain.

REFERENCE SIGNS LIST

11: base material
11a: projected portion (projection)
11b: recessed portion
21: ink
31: fine powder
52: edge
111: base material film roll
112: base material film
113a, 113b, 116, 117, 127: pinch roll
114: die coater
115: mold roll 118: lamination film roll
119: lamination film
120: moth-eye film
121: laminated film roll
P: pitch (distance between tops of projected portions)

The invention claimed is:

1. An optical element comprising
a base including a front surface provided with projected portions at a pitch equal to or shorter than the wavelength of visible light, and side surfaces perpendicular to the front surface and disposed along a periphery of the base, and
fluorine-based fine particles covering the side surfaces of the base and not covering the front surface of the base, wherein the optical element has a contact angle with water of 100° or greater at an edge to which the fluorine-based fine particles are attached.

2. The optical element according to claim 1, wherein the front surface has a contact angle with hexadecane of 20° to 100° at least at the edge.

3. The optical element according to claim 1, further comprising a protective component that covers the front surface,
wherein the protective component shields the front surface from external substances.

4. A display device comprising
the optical element according to claim 1.

5. The optical element according to claim 1, wherein the base further includes a rear surface and the side surfaces extend perpendicularly from the rear surface to the front surface.

* * * * *